United States Patent [19]

Huffine et al.

[11] 4,038,693
[45] July 26, 1977

[54] ANTI-STATIC MAGNETIC RECORD DISK ASSEMBLY

[75] Inventors: Coy Lee Huffine, Rochester; Larry Frederick Mattson, Pine Island; Karl Allen Shidler, Rochester; Norman Edward Slindee, Austin, all of Minn.

[73] Assignee: International Business Machines Corporation, Armonk, N.Y.

[21] Appl. No.: 615,943

[22] Filed: Sept. 23, 1975

[51] Int. Cl.² ................ G11B 5/016; G11B 23/02; H05F 3/00
[52] U.S. Cl. ........................... 360/99; 206/444; 360/133; 361/220
[58] Field of Search ............ 360/99, 133, 86, 97; 206/444, 313; 317/2 R, 2 A, 2 C, 2 F; 274/47

[56] References Cited

U.S. PATENT DOCUMENTS

| | | | |
|---|---|---|---|
| 3,440,091 | 4/1969 | Delmore | 317/2 R |
| 3,532,932 | 10/1970 | Simon | 317/2 R |
| 3,864,755 | 2/1975 | Hargis | 360/99 |
| 3,931,644 | 1/1976 | Ward | 360/133 |
| 3,932,710 | 1/1976 | Dickopp et al. | 360/99 |
| 3,958,066 | 5/1976 | Imamura et al. | 317/2 C |

OTHER PUBLICATIONS

Handbook of Physis, McGraw-Hill Book Company, Inc., pp. 4-8, 4-9, 4-10, 11, and 4-141.

*Primary Examiner*—Alfred H. Eddleman
*Attorney, Agent, or Firm*—Keith T. Bleuer

[57] ABSTRACT

A rotary magnetic record disk assembly comprising a magnetic disk which is rotatably disposed within a containing jacket of material of high electrically insulating characteristics. An electrically conductive layer is disposed on the inside surface of the jacket for draining away electrostatic charge on the jacket.

4 Claims, 15 Drawing Figures

ANTI-STATIC MAGNETIC RECORD DISK ASSEMBLY

CROSS REFERENCE TO RELATED APPLICATION

The invention in this application is related to that in co-pending application of Norman E. Slindee for Magnetic Disk Drive Unit With Flexible Skirt, Ser. No. 615,944, filed Sept. 23, 1975.

BACKGROUND OF THE INVENTION

The invention relates to magnetic recording systems and more particularly to magnetic disk and jacket assemblies.

Such assemblies have been previously proposed and are in current use. Such an assembly is described in the U.S. Pat. No. 3,668,658 issued June 6, 1972 to Ralph Flores et al. The assembly disclosed in this patent includes a magnetic disk which is contained and is rotatably disposed within a square jacket or cover. The jacket has a central opening for revealing a smaller central opening in the disk by means of which the disk can be driven, and the jacket contains two aligned radially extending slots through which a magnetic transducer may extend for the purpose of magnetically reading from or writing on a surface of the disk as the disk is rotatably driven. A wiping material is provided on the inner surfaces of the jacket adjacent the outer surfaces of the disk for providing low friction characteristics and contaminant capture for the disk and for acting as an antistatic device for the static generated due to rotation of the disk.

High electrical resistance materials, such as polyvinyl chloride acetate, have been found particularly suitable for forming the jackets in such assemblies. The favorable characteristics of jackets formed with such materials are low cost, resistance to impact, heat sealability for attaching parts of the jackets together to form a complete unit, etc.; however, jackets of such material have been found to collect large accumulations of static electricity due to normal handling. Such accumulations of static electricity have been found to provide spurious signals in a transducer used with the disk as the static discharges, particularly when the transducer used with the disk is mainly composed of electrically nonconductive material.

SUMMARY OF THE INVENTION

It is an object of the present invention to provide improved means for quickly discharging the accumulations of static electricity carried by the jackets of disk-jacket assemblies. More particularly, it is an object of the invention to provide such static discharging means contained within the jacket so as not to detract from the aesthetic appearance of the assembly.

In brief, the invention proposes that such a jacket be lined with a layer of electrical conductive material, preferably being located between a wipe material directly in contact with the disk and the inner surface of the disk; and we have found that, with such construction, the static accumulation on such a jacket will be quickly drained away to the disk drive machine with which the disk-jacket assembly is used.

DESCRIPTION OF THE PREFERRED EMBODIMENT

Figure 1:
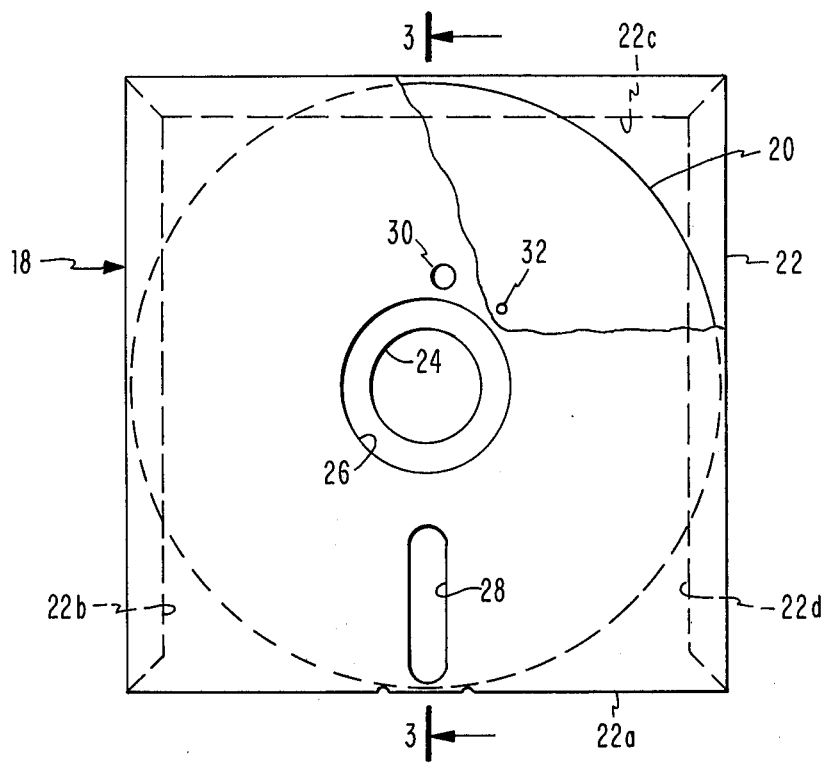
FIG. 1 is a plan view of a magnetic record disk assembly embodying the principles of the invention and including a rotatable disk disposed in a jacket of high electrical insulating material.
Figure 3:
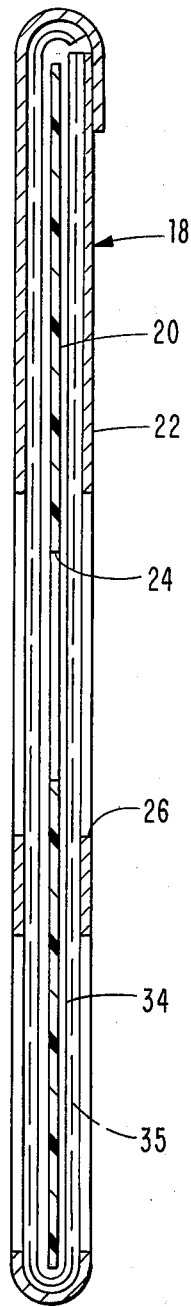
FIG. 3 is a sectional view taken on line 3—3 of FIG. 1 with the parts of the disk assembly being exploded for better illustration.
Figure 5:
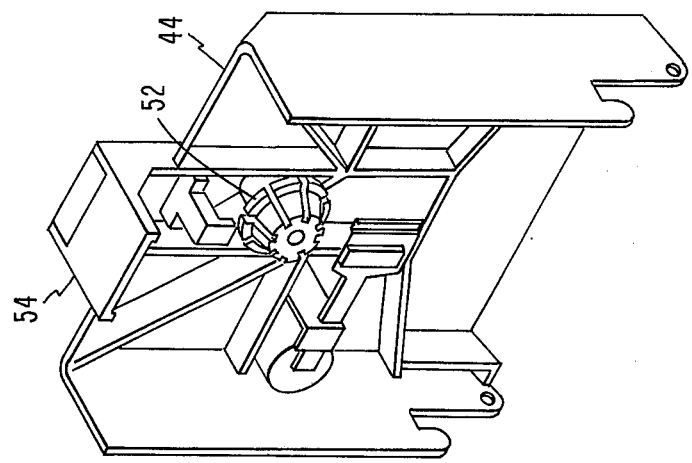
FIG. 5 is a perspective view of a cover of the disk drive machine.

The disk assembly 18 shown in FIGS. 1 and 3 may be seen to comprise a magnetic disk 20 disposed within a square jacket 22. The disk 20 is of a thin, flexible material, such as polyethylene terephthalate (Mylar) of about 0.003 inch thickness; and the disk 20 has an unoriented $Fe_2O_3$ coating on both sides. The jacket 22 may be of a more rigid but still somewhat flexible vinyl sheet material, such as polyvinyl chloride, or more preferably polyvinyl chloride acetate, of 0.010 inch thickness, for example. Both the magnetic disk 20 and the jacket 22 are thus of electrically nonconductive material. The disk 20 has a central opening 24, and the jacket 22 has larger central openings 26 in its two thicknesses. In addition, the jacket 22 has aligned radial slots 28 and aligned round openings 30 in its two thicknesses. The openings 30 are adapted to align with an opening 32 in the disk 20 as the disk rotates within the jacket 22.

A layer 34 (see FIG. 3) of a porous, low friction material is disposed between the disk 20 and the inner surface of the jacket 22. A particular material for this purpose may be the dusting fabric which is manfactured by Minnesota Mining and Manufacturing Company and is designated 3M550, generally known in the art as "pink wipe". The functioning of such a wipe in a disk assembly as so far described herein is set forth in U.S. Pat. No. 3,668,658, issued June 6, 1972, which may be also referred to for additional details of such a disk assembly.

An electrically conductive layer 35 is disposed between the layer 34 and the inner surface of the jacket 22. The layer 35 may be made of conductive ink and provides an antistatic effect with respect to static accumulating on the jacket 22 as will be more specifically hereinafter described.

The jacket 22 may constitute a single piece of polyvinyl chloride acetate having two halves folded together to form a lower edge 22a (see FIG. 1) and the jacket 22 is provided with flaps 22b, 22c and 22d which are bent over and are bonded on one outer surface of the assembly 18 in order to form a closed structure for the disk 20.

Figure 2:
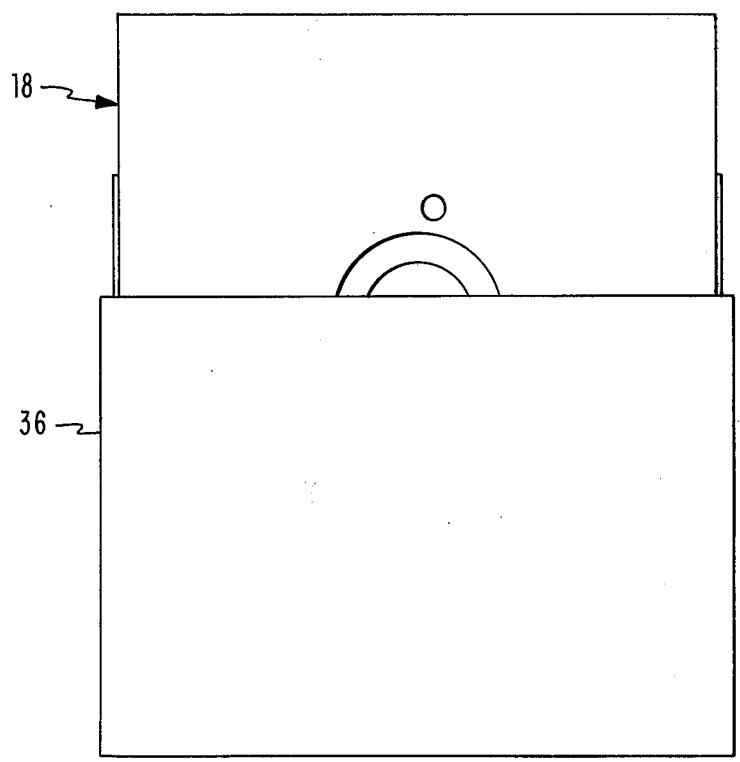
FIG. 2 is a plan view of the record disk assembly showing the assembly being inserted into a protective envelope therefor.

The assembly 18 is adapted to be stored in a protective envelope 36 which is shown in FIG. 2. The assembly 18 in being slid into and out of an envelope 36 may be expected to accumulate a static charge, apparently on its outer surface; and this charge causes difficulty in magnetically reading from a surface of the disk 20 without the provision of the conductive layer 35. The static charge on the jacket 22 may also be caused in other ways, such as simply by carrying the assembly 18 in a person's hand as he moves across a floor carpet. The retention of the charge on the jacket 22, in fact, is difficult to avoid and varies depending on the humidity in which the assembly 18 exists and is undoubtedly due in part to the highly nonconductive nature of the polyvinyl chloride acetate of which the jacket is preferably composed.

The machine shown in FIGS. 4-7 is made up of a vertical disk assembly frame 42 and a cover 44 which is hingedly mounted on the frame 42 by means of studs 46. A metal hub 48 is rotatably disposed in the frame 42 and is driven from a drive motor 49 by any suitable drive mechanism, such as a belt and pulleys (not shown). The hub 48 has a countersunk opening 50 for purposes to be described.

The cover 44 has a tapered collet or arbor 52 (which may be made of plastic) rotatably mounted in it, and the collet 52 is so shaped and located that it fits in the opening 50 when the cover 44 is moved toward or closed with respect to the frame 42. The collet 52 extends through the opening 24 in the disk 20, and the disk 20 is thus clamped between the hub 48 and the collet 52 to be rotatably driven when the disk assembly 18 is properly located in the machine. The cover 44 may be held in place with respect to the frame 42 by any suitable latch 54 so that the disk 20 is gripped between the collet 52 and the hub 48.

Figure 4:
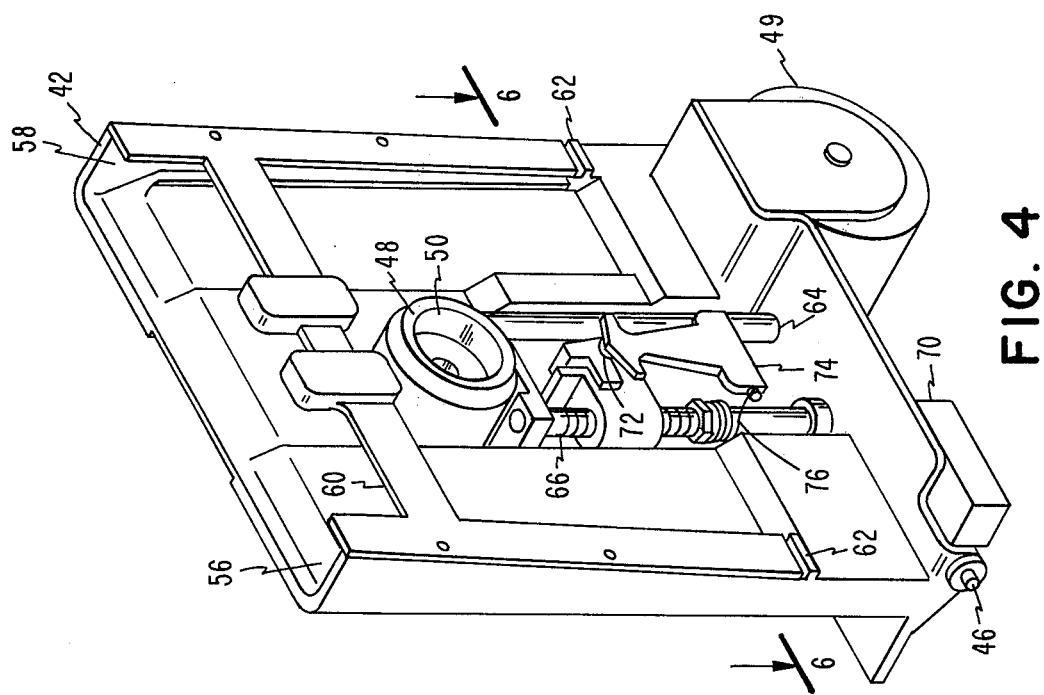
FIG. 4 is a perspective view of the frame of a disk drive machine with which the assembly of FIGS. 1 and 3 may be used.

The frame 42 is provided with a pair of opposite tapered slots 56 and 58 into which the disk assembly 18 may be moved. Sides of the slots 56 and 58 are formed by an H-shaped auxiliary support 60 which is screwed onto the frame 42 as shown in FIG. 4. The disk assembly 18 is simply moved downwardly into the slots 56 and 58 to bring the central disk opening 24 into alignment with the countersunk opening 50 prior to a closing of the cover 44, and a pair of abutments 62 are provided at the bottoms of the slots 56 and 58 for holding the assembly 18 properly positioned in the frame 42.

The frame 42 has a slide rod 64 fixed within it and has a lead screw 66 rotatably disposed in it opposite the rod 64. A slider 68 is slideably disposed on the rod 64 and has a threaded connection with the screw 66. An electric motor 70, preferably of the electrical stepping type, is fixed on the bottom of the support 42 and is driveably connected with the screw 66 so as to move the slider 68 longitudinally along the slide rod 64. The slider 68 carries an electrical transducer 72 (see FIGS. 4 and 7), and a pressure arm 74 is swingably mounted on the slider 68 and has a protruding portion adapted to enter into one of the elongate slots 28 in the assembly 18 for forcing the disk 20 against the transducer 72. A spring 76 provides force on the arm 72 for this purpose.

An electromagnet 78 (see FIG. 6) is provided for swinging the arm 74 with respect to the transducer 72. The electromagnet has a core 80, and an armature 82 moves toward and away from the core 80. The armature 82 is in the form of a lever which is fulcrumed in an opening 84 in a standard 86 that is fixed with respect to the cover 44 by means of another standard 88 screwed onto the cover 44. A spring 90 is provided between the standard 88 and the lever 82. A lever extension 92 of relatively thin flexible material is fixed at its base end to the lever 82, and an adjustment screw 94 extends through the distal end of the lever 82 and is in contact with the lever extension 92 for adjusting extension 92 with respect to lever 82.

Figure 6:
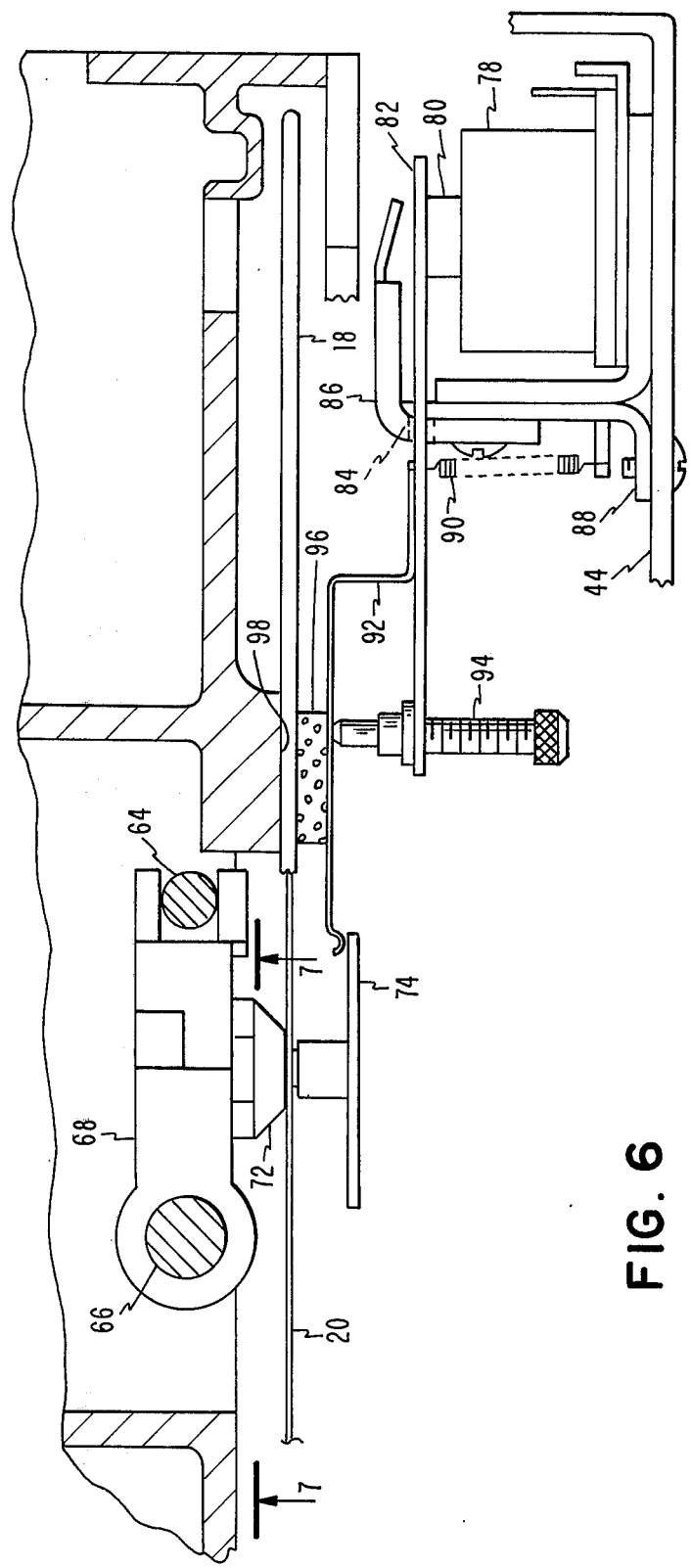
FIG. 6 is a sectional view on an enlarged scale taken on line 6—6 of FIG. 4 with the cover shown in FIG. 5 being assembled on the frame shown in FIG. 4.
Figure 8A:
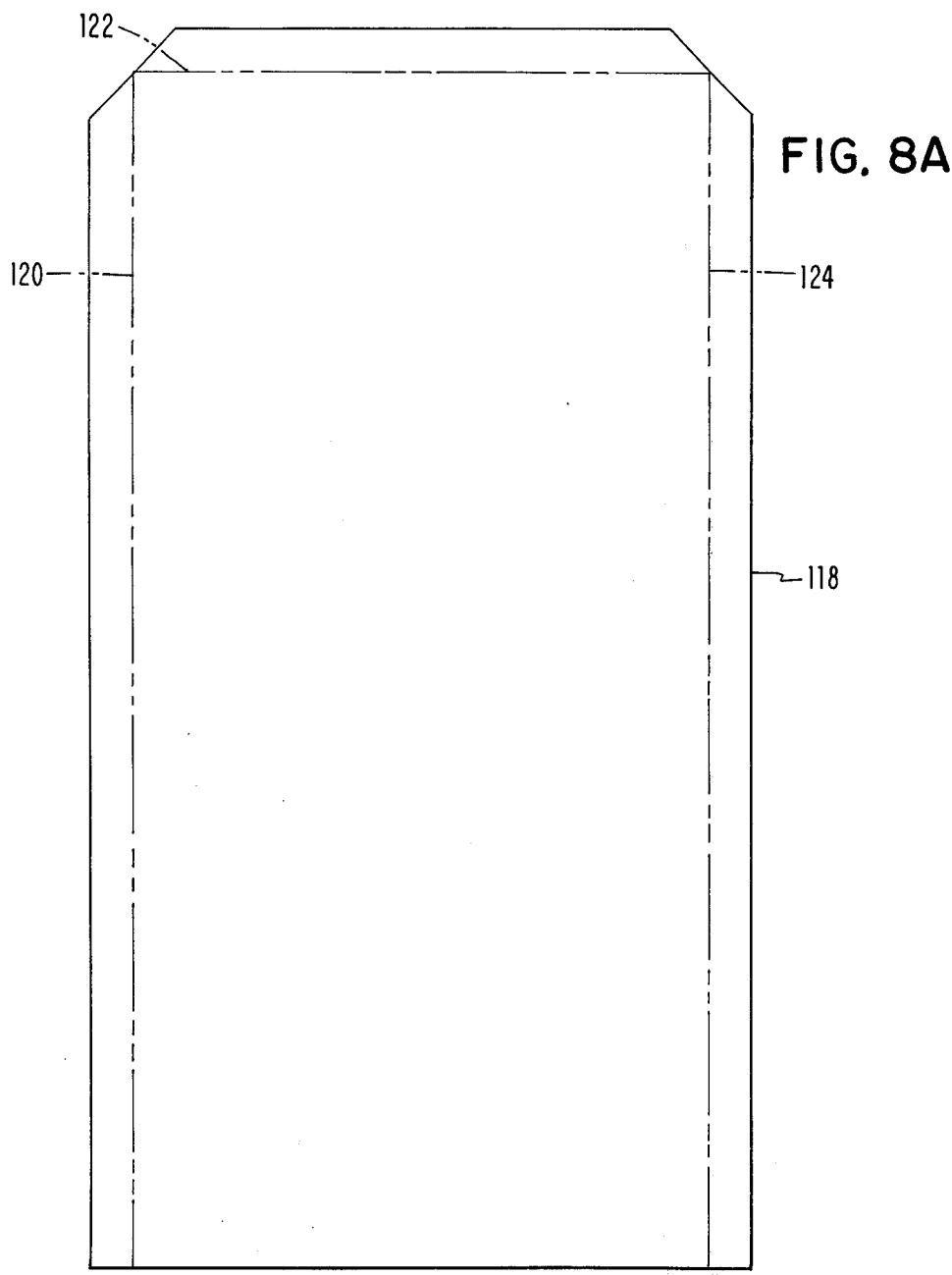
FIGS. 8A, 8B, and 8C are respectively a plan view of a blank from which the jacket of the record disk assembly may be formed, a sectional view of an ink container, and an elevational view of an ink roll by means of which ink from the container may be applied onto the blank.
Figure 8C:
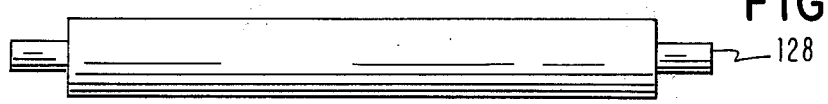
Figure 8B:
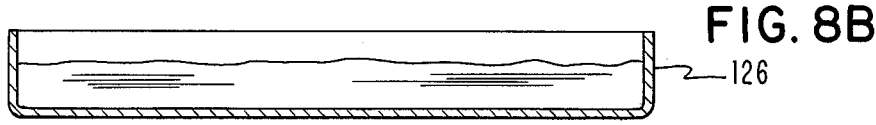

The extension 92 is quite elongate compared with the arm 74, and the extension 92 extends beneath the upper end of the arm 74 so that, as the arm 74 travels vertically with the slider 68, the lever extension 92 nevertheless remains beneath the upper end of the arm 74. The lever extension 92 carries a foam rubber pressure member 96 that is located opposite a platen portion 98 of the frame 42, and the pressure member 96 is adapted to grip the disk assembly 18 between it and the platen portion 98 as is illustrated in FIG. 6.

Figure 7:
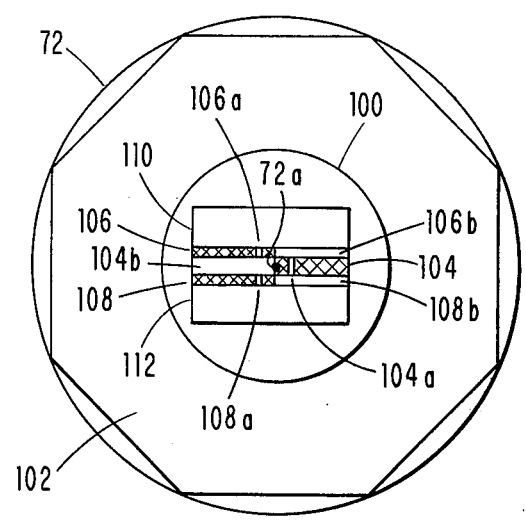
FIG. 7 is a face view on an enlarged scale of a transducer head in the disk drive machine taken on line 7—7 of FIG. 6.

Referring to FIG. 7, the transducer 72 may be seen to have a round central portion 100, which may be flat or slightly spherical, and an outer portion 102 which recedes from the central portion 100. The transducer 72 has substantially the same construction as the tranducer disclosed in U.S. Pat. No. 3,846,840 and has a read/write magnetic core 104 with a gap 104a and a pair of erase magnetic cores 106 and 108 with gaps 106a and 108a. The cores 104, 106 and 108 are disposed in a stack with the stack being completed by fillers 104b, 106b and 108b for the cores. A pair of support plates 110 and 112 are provided on opposite sides of the stacked cores 104, 106 and 108; and the outer surfaces of the plates 110 and 112 and of the cores 104, 106 and 108 and fillers 104b, 106b and 108b all lie in the same plane (or in the same slightly spherical contour) as the rest of the central portion 100 of the transducer 72. The cores 104, 106 and 108 are preferably ferrite. The plates 110 and 112 and fillers 104b, 106b and 108b are of ceramic material; and the rest of the portion 100 and the portion 102 are of a rigid phenolic material so that the transducer 72 as a whole is of electrical insulating material. As is illustrated in FIG. 7, the cores 104, 106 and 108 as an assembly are centrally located in the central region 100 of the transducer 72 and are centered with respect to the center 72a of the transducer 72. It will be understood that suitable electric coils (not shown) are located in the transducer 72 and are in energy transferring relationship with respect to the cores 104, 106 and 108 and with the gaps 104a, 106a and 108a so that the gap 104a is effective for magnetically reading or writing on the magnetic surface of the disk 20 and the gaps 106a and 108a are effective for erasing at the edges of a magnetic track with which the gap 104a is effective.

The machine shown in FIGS. 4-7 functions as follows: With the cover 44 swung open about the studs 46, the collet 52 is spaced with respect to the hub 48; and the disk assembly 18 is dropped into the slots 56 and 58. The disk assembly bottoms on the abutments 62 and in this position has the center of its disk opening 24 aligned with the center of the countersunk opening 50 in the hub 48. The cover 44 is then swung closed, and the tapered portion of the collet 52 enters the opening 50; and the disk 20 is clamped between the hub 48 and the collet 52. The latch 54 is then effective to engage the frame 42 so as to hold the cover 44 closed. It is assumed that the electromagnet 78 is initially de-energized, and the spring 90 is thus effective to hold the lever 82 swung counterclockwise from its position as shown in FIG. 6; and the pressure member 96 is under these conditions spaced from the platen portion 98 of the frame 42. Also, the lever extension 92 in this position holds the swinging arm 74 outwardly with respect to the transducer 72. The disk assembly 18 is thus, under these conditions, relatively loose within the slots 56 and 58. The electromagnet 78 it then energized, swivelling the lever 82 about the edges of the opening 84, moving the pressure member 96 toward the platen portion 98 so as to grip the disk assembly 18 between the pressure member 96 and portion 98. The gripping action of the pressure member 96 is not sufficiently great, however, to prevent rotation of the disk 20 in the jacket 22. This swivelling of the lever extension 92 also causes it to separate from the upper portion of the swing arm 74 so that the spring 76 is effective to cause the arm 74 to bear against the disk 20 and hold it with slight force against the portion 100 of the transducer 72. The motor 49 is in operation so as to rotate the hub 48 and disk 20. The cores 104, 106 and 108 are then in contact with the face of the disk 20 remote from the swing arm 74, and a magnetic reading or writing may take place by means of the gap 104a. The gaps 106a and 108a provide a tunnel erasing action with respect to a track on the disk 20 on which the gap 104a provides a writing action. The motor 70 is used ford drivingly rotating the screw 66 for thus moving the slider 68 and thus the transducer 72 toward and away from the center of the hub 48 for causing the transducer 72 to be effective on different concentric tracks on the disk 20.

The disk assembly 18 may be made as is illustrated in FIGS. 8-12. A blank 118 of polyvinyl chloride acetate in the shape shown in FIG. 8A is utilized for the jacket 22; and an area bounded by lines 120, 122 and 124 has electrically conducting ink applied on it. The application of ink may be from an ink container 126 (FIG. 8B) and may be by means of an ink roll 128 (FIG. 8C). The roll 128 is dipped into the ink in the container 126 and is then rolled across the blank 118 within the area defined by the lines 120, 122 and 124. After the ink, which is in liquid form, has thus been applied to the blank 118, the ink is allowed to dry to form the conductive ink layer 35 which adheres to the inner surface of the jacket 22.

Figure 9A:
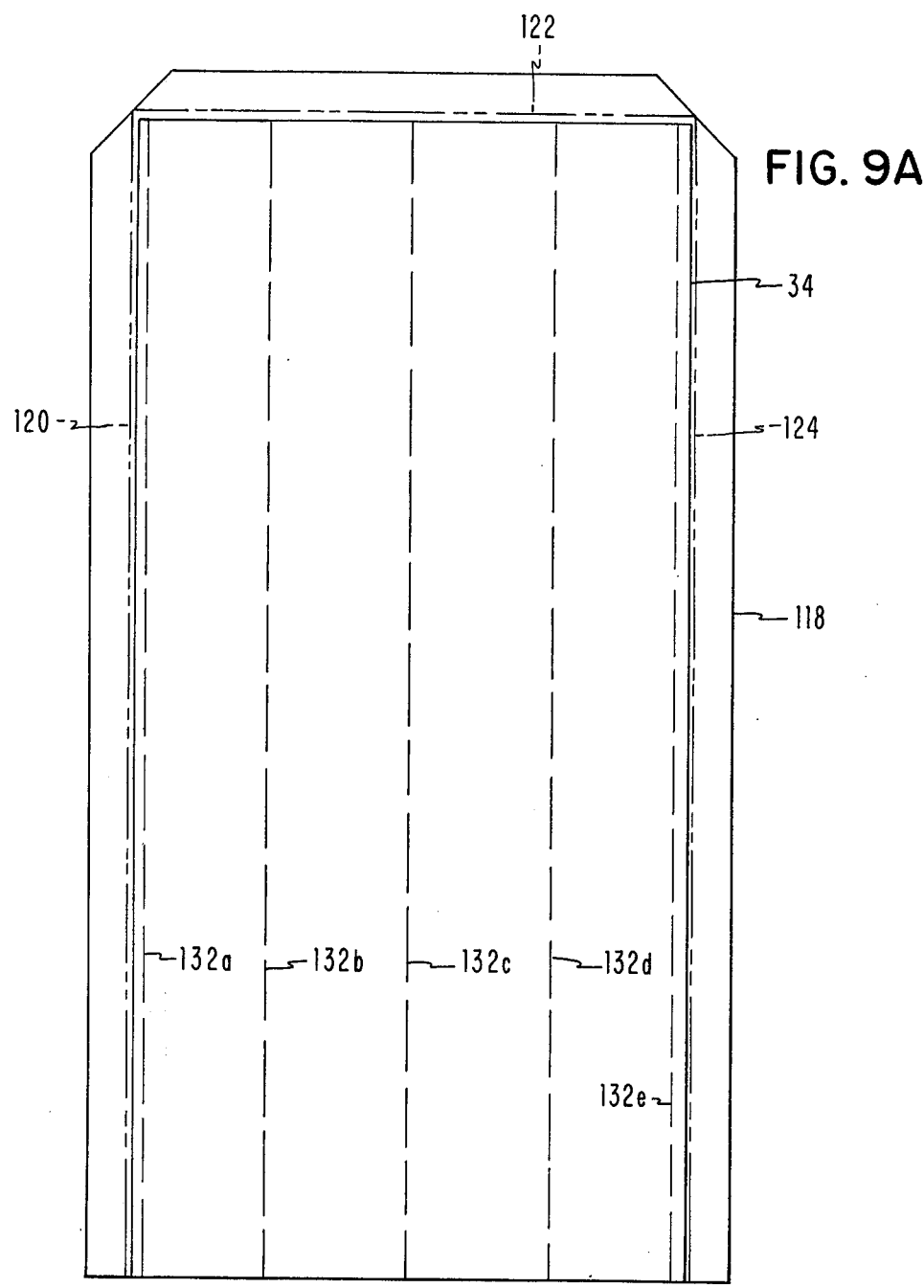
FIGS. 9A and 9B are respectively a plan view of the blank subsequent to the inking and an elevational view of a plurality of heated rolls by means of which an inner wipe may be fixed with respect to the blank.
Figure 9B:
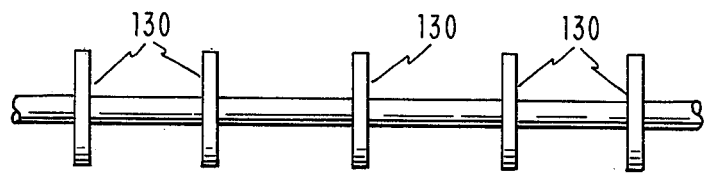

The wipe 34 is then placed in position as shown in FIG. 9A on the blank 118, and the wipe 34 is fixed onto the blank 118 by using the heated rolls 130 (FIG. 9B) and rolling them across the wipe 34 on the blank 118 so as to affix the wipe 34 to the blank 118 along the lines 132a, 132b, 132c, 132d and 132e.

Figure 10:
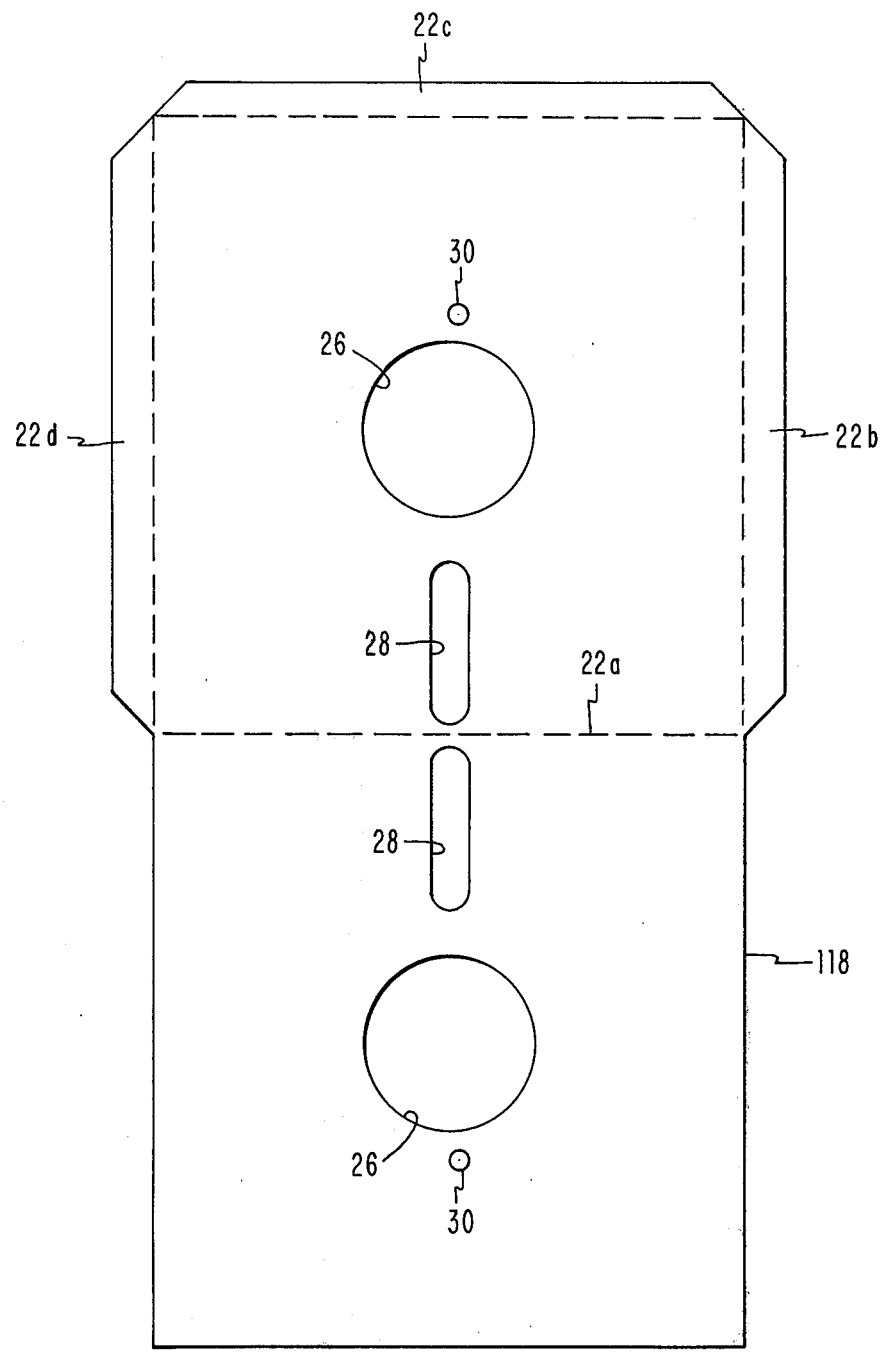
FIG. 10 is a plan view of the blank after the blank has subsequently been provided with openings through it and has been trimmed.

Side edge portions are then cut from the lower part of the blank 118, and this results in the blank 118 having the flaps 22b, 22c and 22d as shown in FIG. 10. Also, the openings 30, 26 and 28 are cut through the blank 118 at this time.

Figure 12:
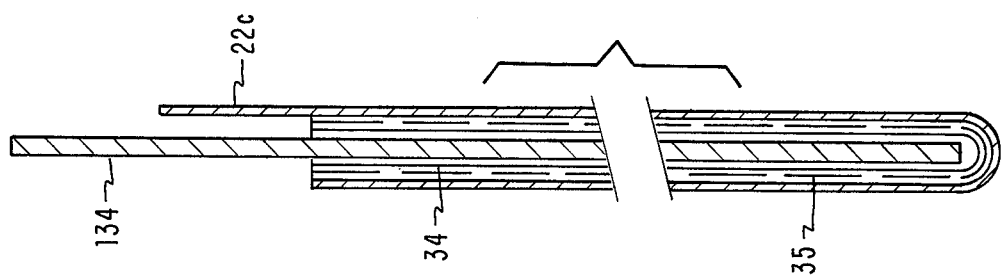
FIG. 12 is a sectional view taken on line 12—12 of FIG. 11 but showing a folding spacer in place in the jacket to assure a void within the jacket sufficient in thickness to receive a magnetic disk.
Figure 11:
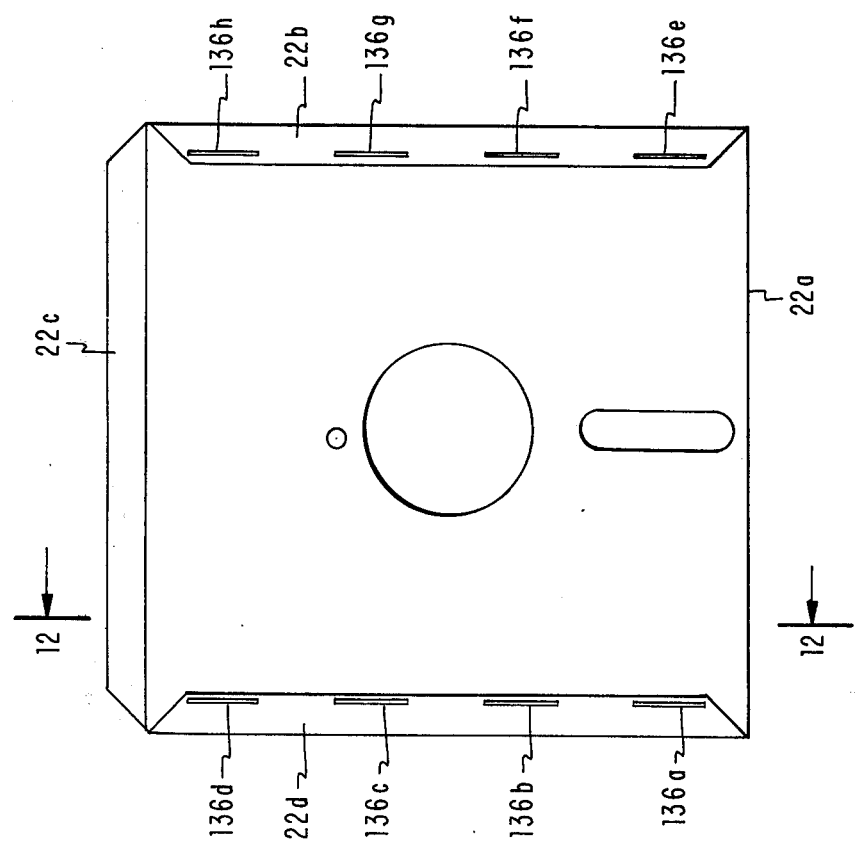
FIG. 11 is a plan view of the blank after it has been folded to form a jacket for a magnetic disk assembly.

The blank 118 is then folded along the line 22a seen in FIG. 10, and this folding is about a sheet metal spacer shown in FIG. 12. The flaps 22b and 22d are then bent around the half of the blank 118 shown in the lower portion of FIG. 10 and are bonded to this portion of the blank 118 along lines 136a-136h shown in FIG. 11. This bonding may be by means of pressure and heat. The metal spacer 134 remains in place between the halves of the blank 118 during this operation so as to assure that there is sufficient spacing between the halves of the blank 118 so that the disk 20 may freely rotate within the jacket 22. The spacer 134 is then withdrawn from the jacket 22 as completed to this point, and the disk 20 is inserted into the jacket. The flap 22c is then bent around the upper marginal portions of the jacket 22 and is bonded to the same rear face of the jacket 22 as are the flaps 22b and 22d to thus complete the disk assembly as is shown in FIGS. 1 and 3.

As has been previously described, during ordinary usage and handling of the disk assembly 18, such as by moving it into and out of the protective envelope 36, the jacket 22 accumulates an electrostatic charge apparently on its outer surface. If the disk assembly 18, but lacking the conductive layer 35, is used in the disk drive machine shown in FIGS. 4-7, this electrical charge migrates from the exterior surface of the jacket 22 and accumulates on the transducer 72. After an accumulation of charge on the transducer 72 to a certain high voltage, a transient discharge occurs, probably within the transducer 72 itself. Such discharges occur periodically for a prolonged period of time, such as 15 minutes, until the charge on the jacket 22 has been dissipated. Each such discharge causes an extraneous bit to be sensed by the transducer 72 during reading and prevents the machine of FIGS. 4-7 from being used effectively for this period of time. The charge on the exterior surface of the jacket 22 is retained for this prolonged period due to the fact that the jacket 22 is made of a material which has a very high resistivity. This problem is particularly concerned and prevalent with a transducer 72 of the ferrite type which is of electrically insulating material; and, in fact, the problem can be overcome by using a conventional transducer which is mainly of metal. This is true, because transducers which are made of metal do not allow accumulation of charge on them and rather conduct the charge to ground (the frame 42 of the machine). The ferrite transducer 72, nevertheless, is preferred and is used in connection with the invention, particularly since the ferrite transducer 72 is of relatively low cost and provides a more accurate reading and writing action. The action of the electrostatic charge on the exterior surface of the jacket 22 which disturbs the reading action of the ferrite transducer 72 should be distinguished from any static charge which occurs due to rotation of the disk 20 within the jacket 22. The wipe layer 34 functions to minimize any effects of such a static charge as is described in U.S. Pat. No. 3,668,658.

The presence of the electrical conducting layer 35 within the jacket 22 has been found to very materially decrease the time during which troublesome discharge takes place in the transducer 72, such as from about 15 minutes to 15 milliseconds. This shortened time of discharge is so short that the electrostatic charge on the exterior of the jacket 22 ceases to be a problem in putting the disk drive machine of FIGS. 4-7 into operation. This is true even though the electrically conducting layer 35 is completely within the jacket 22 and does not come directly into contact with portions of the disk drive machine which are normally of metal, such as the abutments 62 and the hub 48.

The electrostatic charge which resides on the outer surface of the jacket 22 may be dissipated to the machine frame 42 acting as ground through three general paths, namely, (1) directly to the machine frame 42, (2) through the hub 50 to the macine frame 42, or (3) through the transducer 72 to the machine frame 42.

Charges which flow directly to the machine frame 42 may travel in several branch paths. The most straightforward of these is a branch path including only the outer surface of the jacket 22 from the original position of the charge on the outer surface of the jacket 22 to the nearest grounding point. Parts of the machine frame in direct contact with exterior parts of the jacket 22 represent such grounding points and may be the abutments 62 or the inner surfaces of the frame 42 forming the slots 56 and 58. Another such branch path and which includes the layer 35 of relatively low resistivity compared to that of the material of the jacket 22 is a branch path in which a charge on the exterior surface of the jacket 22 moves from its original position directly through the jacket material into the inner conductive layer 35. Once in the inner layer 35, the charge may travel to any of the above-mentioned grounding points by tunneling through the material of the jacket 22 at the grounding point. Another such branch path is one in which the charge travels by conduction on the outer surface of the jacket 22 to an opening in the jacket 22 (an opening 28, an opening 30 or an opening 26), then moves inwardly around the edges of the opening to the conductive layer 35 and flows through the conductive layer to a grounding point as in the branch path just above mentioned.

Charges which flow to the hub 48 functioning as a grounding point may do so through several branch paths. In one such branch path, a charge travels by conduction on the surface of the jacket 22 to one of the openings 26, 28 or 30 in the jacket 22, travels around the edges of the opening to the conductive layer 35 and from thence travels on the recording surface of the disk 20 to the hub 48. The $Fe_2O_3$ coating on the disk 20 may act as a conductor for these charges particularly since it includes carbon in its makeup providing some conductivity. In another branch path, a charge on the exterior surface of the jacket 22 may flow directly through the material of the jacket 22, through the layers 34 and 35 onto the recording surface of the disk 20, and from thence the charge may flow across the $Fe_2O_3$ coating of the disk 20 to the hub 48 as in the previously mentioned branch path. Charges originally lying quite remote from the hub 48 use the last mentioned branch path to rapidly travel to the hub 48.

Charges which flow to the transducer 72 do so in branch paths which are exactly analagous to those in which charges travel to the hub 48. Such branch paths for the transducer 72 include one in which charges travel on the outer surface of the jacket 22 to one of the openings 26, 28 or 30, thence to the conductive layer 35 and from thence across the recording surface of the disk 20 to the transducer 72. In another such branch path, a charge may flow directly through the material of the jacket 22, through the layers 34 and 35 and onto the recording surface of the disk 20 from which the charges flow across the coating on the disk 20 to the transducer 72.

Charges accumulating on the transducer 72 may be sensed by the recording system connected to the transducer 72 as extraneous bits. This extraneous bit sensing is diminished by the action of the conductive layer in the following ways: (1) charge distribution, (2) charge interception, (3) shortened discharge times, and (4) reduction of potential differences.

Charge distribution is accomplished by the conductive layer 35 by providing a means in which charges can simultaneously flow to several grounding points at the same time. Since the conductive layer 35 is virtually equipotential, if any point of the layer 35 is grounded (either directly or through the thickness of the jacket 22) all of the inner surface of the jacket 22 is similarly grounded. Most importantly, this charge distribution function of the conductive layer 35 allows charges from remote parts of the jacket 22 to be dissipated by any grounding point, rather than each grounding point only collecting those charges nearby.

In its charge interception (or diversion) function, the conductive layer 35 increases the percentage of the total charge which flows to the frame 42 and hub 48 and lowers the percentage of the charges which flow to the transducer 72 due to the usual laws of current division. This function of the conductive layer 35 is particularly important in reducing the effect of the charge on the exterior surface of the jacket 22 on the transducer 72 when the latter is used in its reading function. Since charge distribution occurs in the conductive layer 35, charges which were formerly collected on the recording surface of the disk 20 in the area of the disk 20 in contact with the transducer 72 are instead conducted away from the vicinity of the tranducer 72 to multiple grounding points in parallel paths. For example, a charge on the exterior surface of the jacket 22 and at the edge of the slot 28 receiving the transducer 72 is attracted by the relatively close coextensive edge of the conductive layer 35 at the edge of this slot 28 rather than being attracted to the transducer 72 which is relatively remote compared to this edge of the conductive layer 35.

The conductive layer 35 causes shortened discharge times for charges on the exterior surface of the jacket 22 to occur because the charge decay time for any such charge decreases as the time constant RC decreases. (R) and (C) in the expression (RC) are respectively the resistance to ground and the capacitance to ground for any small area of charge on the exterior surface of the jacket 22. The capacitance (C) to ground for any small charged area on the jacket 22 increases with the conductive layer 35 present; however, the total resistance (R) to ground from any small charged area on the jacket 22 is reduced because of the shortening of surface conduction path lengths and because of the paralleling of paths by the conductive layer 35. Even though C increases, R is reduced enough that the decay time for any charge on the exterior surface of the jacket 22 is reduced.

Reduction of potential differences occurs through the following means: Because of the proximity of the conducting layer 35 to the surface charge, capacitance to ground of a small unit of surface area is increased. For a given charge on any capacitor if the capacitance is increased, the capacitive voltage is decreased. Through this action, surface potential difference to ground is reduced, and in turn, the magnitude of current flow through all of the conducting paths above mentioned is reduced. Most importantly, charge migration toward transducer 72 is reduced.

For the successful operation of the conductive layer 35 as just described, we consider it important that the layer 35 shall have a very low resistance compared to that of the polyvinyl chloride acetate of the jacket 22 and also compared to the $Fe_2O_3$ coating on disk 20. The resistivity of the polyvinyl chloride acetate of the jacket 22 is about $1 \times 10^{15}$ ohms per square; the resistivity of the Fe$_2$O$_3$ coating on the disk 20 may be between $5 \times 10^9$ and $1 \times 10^6$ ohms per square; and the resistivity of the conductive coating 35 should preferably be between $1 \times 10^8$ ohms per square and 0 ohms per square. The resistance of the jacket material is thus at least one million times that of the layer 35, although the latter may have appreciable resistance. Incidentally, the thickness of the polyvinyl chloride acetate of the jacket 22 may be 0.010 inch; the thickness of the Fe$_2$O$_3$ coating on the disk 20 may be 90–120 microinch; and the thickness of the conductive coating of the layer 35 may be 0.001 inch, for example.

We also consider it important that the conductive layer 35 shall cover as much as possible of the inner surface of the jacket 22 so that a large equipotential surface within the jacket 22 is achieved. It is also considered important that the conductive layer 35 be coextensive with and completely surround the openings 26 and 28 in the jacket 22 so as to provide equipotential edges around the hub 48 and around the trandducer 72 whereby the charge on the exterior surface of the jacket 22 may easily migrate from the outer surface of the jacket 22 around the edges of these openings and into the conductive layer 35.

Although different types of conductive ink may be used for forming the conductive layer 35, a water-based ink having carbon black of 13% by weight of the solids therein has been found satisfactory. The ink shall be formulated so that when dry it firmly adheres to the polyvinyl chloride acetate material of the jacket 22 and for this purpose may have shellac as one of its constituents. Also, ordinary Higgins India Ink available in familiar stationery stores has been found satisfactory. In lieu of the ink for forming the conductive layer 35, foils of copper, aluminum, gold and platinum, for example, may be used. Alternately, silver particulate paint may be used for forming the layer 35, or the jacket 22 could be metallized with aluminum on its inner surfaces. Other materials besides polyvinyl chloride or polyvinyl chloride acetate may be used for the jacket 22 if desired, but polyvinyl chloride acetate is preferred due to a multitude of favorable properties of this material for the jacket.

Also, although the conductive layer 35 has been described and has been shown in the drawings as being on the interior surfaces of the jacket 22, the conductive layer 35 could also, if desired, be placed on the outer surface of the jacket 22 with favorable results. It is preferred, however, that the layer 35 be placed within the jacket 22, since it is thereby much less likely to be damaged in the usage of the assembly 18.

We claim:
1. A magnetic record assembly including:
    a magnetic disk of highly electrically insulating, flat, uniform thickness sheet material,
    a jacket of highly electrically insulating material enclosing said disk and having a central opening through it by means of which the disk may be rotatably driven within the jacket and having a slot therein for receiving a magnetic transducer to have a data transferring relationship with the disk and having flat internal faces adjacent to and extending along the faces of said disk,
    a layer of a porous low friction dusting fabric within said jacket and in wiping contact with the faces of said disk as the disk rotates within the jacket, and
    a uniform thickness flat thin layer of electrically conducting non-porous material within said jacket and in contact with and between said flat internal jacket faces and said layer of dusting fabric for draining static electricity from the jacket.
2. A magnetic record assembly as set forth in claim 1, said layer of electrically conducting non-porous material completely surrounding said central opening of said jacket and also completely surrounding said slot.
3. A magnetic record assembly as set forth in claim 1, said layer of electrically conducting non-porous material constituting an ink on said inner surfaces of said jacket which in dry conditions has a resistivity less than $1 \times 10^8$ ohms per square.
4. In a magnetic record assembly which includes a magnetic disk of highly electrically insulating, flat, uniform thickness sheet material, a jacket of highly electrically insulating material enclosing said disk and having a central opening through it by means of which the disk may be rotatably driven within the jacket and having a slot therein for receiving a magnetic transducer to have a data transferring relationship with the disk and having flat internal faces adjacent to and extending along the faces of said disk, and a layer of a porous, low friction dusting fabric within said jacket and in wiping contact with the faces of said disk as the disk rotates within the jacket, the improvement which comprises:
    the provision of a uniform thickness thin layer of electrically conducting non-porous material positioned within said jacket and in contact with and between said flat internal jacket faces and said layer of dusting fabric for the purpose of draining off static electricity from the jacket.

* * * * *